United States Patent
Nakagawara et al.

(10) Patent No.: US 9,216,651 B2
(45) Date of Patent: Dec. 22, 2015

(54) ELECTRIC VEHICLE CONTROL DEVICE

(71) Applicant: Nissan Motor Co., Ltd., Yokohama-shi, Kanagawa (JP)

(72) Inventors: Hidemitsu Nakagawara, Yokohama (JP); Hisahiro Nabashima, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 14/419,662

(22) PCT Filed: Aug. 20, 2013

(86) PCT No.: PCT/JP2013/072215
§ 371 (c)(1),
(2) Date: Feb. 5, 2015

(87) PCT Pub. No.: WO2014/045785
PCT Pub. Date: Mar. 27, 2014

(65) Prior Publication Data
US 2015/0210166 A1 Jul. 30, 2015

(30) Foreign Application Priority Data
Sep. 24, 2012 (JP) .................................. 2012-209821

(51) Int. Cl.
| | |
|---|---|
| B60L 3/04 | (2006.01) |
| B60L 11/12 | (2006.01) |
| G06F 11/00 | (2006.01) |
| G06F 11/30 | (2006.01) |
| B60L 3/00 | (2006.01) |
| B60L 11/18 | (2006.01) |
| B60L 15/20 | (2006.01) |
| G06F 11/07 | (2006.01) |

(52) U.S. Cl.
CPC .................. *B60L 3/04* (2013.01); *B60L 3/0084* (2013.01); *B60L 11/123* (2013.01); *B60L 11/1803* (2013.01); *B60L 11/1864* (2013.01); *B60L 11/1868* (2013.01); *B60L 15/20* (2013.01); *G06F 11/00* (2013.01); *G06F 11/30* (2013.01); *B60L 2210/10* (2013.01); *B60L 2220/14* (2013.01); *B60L 2240/423* (2013.01); *B60L 2240/429* (2013.01); *G06F 11/0796* (2013.01); *Y02T 10/6217* (2013.01); *Y02T 10/7005* (2013.01); *Y02T 10/7077* (2013.01)

(58) Field of Classification Search
None
See application file for complete search history.

(56) References Cited

FOREIGN PATENT DOCUMENTS

| | | |
|---|---|---|
| JP | 5-158742 A | 6/1993 |
| JP | 10-177504 A | 6/1998 |
| JP | 2000-70590 A | 3/2000 |
| JP | 2006-129557 A | 5/2006 |
| JP | 2006-155915 A | 6/2006 |
| JP | 2008-223692 A | 9/2008 |
| JP | 2009-268286 A | 11/2009 |
| KR | 10-0921098 B1 | 10/2009 |

*Primary Examiner* — John R Olszewski
*Assistant Examiner* — Gerrad A Foster
(74) *Attorney, Agent, or Firm* — Global IP Counselors, LLP

(57) ABSTRACT

An electric vehicle control device includes a first microcomputer and a second microcomputer and a reset process device. The first and second microcomputers share a power source, have separate control functions, and allow for independent rewriting of their respective control programs. The reset process device monitors mutual microcomputer operation and performs a reset process that turns off power relays belonging to an onboard power system when a microcomputer operation error is identified. The reset process device includes a power shut-off reset process unit for performing a reset process that shuts off the flow of power through the onboard power system and turns off the power relays in this powered-off state when resetting due to a microcomputer operation error not caused by a microcomputer error being identified.

15 Claims, 3 Drawing Sheets

ELECTRIC VEHICLE CONTROL DEVICE

CROSS-REFERENCES TO RELATED APPLICATIONS

This application is a U.S. National stage application of International Application No. PCT/JP2013/072215, filed Aug. 20, 2013, which claims priority to Patent Application 2012-209821 filed on Sep. 24, 2012, the entire contents of which are incorporated herein by reference.

BACKGROUND

1. Field of the Invention

The present invention relates to an electric vehicle control device that includes two mutually monitoring microcomputers and performs a reset process (initialization process) when an error in microcomputer operation is identified.

2. Background Information

There is known in the art an electronic control device having two microcomputers sharing a common power source, that system monitoring operation is blocked when at least one of the microcomputers is writing so that a reset process is not performed (see, for example, Laid-open Japanese Patent Application Publication No. H10-177504).

SUMMARY

However, in a conventional electronic control device, when, for example, a monitoring signal is suspended due to a control program being rewritten and an error is identified, a reset process is performed. Thus, when a conventional electronic control device is applied to an electric vehicle, there is a problematic risk of a switch contact of a power relay disposed in an onboard power system fusing, making it impossible to turn off the power relay when a reset process is performed due to a microcomputer error.

Specifically, in the case of an electric vehicle, when a microcomputer reset process is performed, a power relay of the onboard power system is forcibly turned off as a fail-safe function regardless of whether power is flowing through the onboard power system due to battery charging or discharging.

The present invention was conceived in view of the problem described above, an object thereof is to provide an electric vehicle control device that prevents fusion in a power relay when a reset is performed as the result of a microcomputer operation error not caused by a microcomputer error being identified.

In order to achieve the object proposed above, an electric vehicle control device according to the present invention is provided with a first microcomputer and a second microcomputer that share a power source, possess separate control functions, and allow for independent rewriting of their respective control programs, and a reset process device for monitoring mutual microcomputer operation of the first microcomputer and the second microcomputer and performing a reset process that turns off a power relay belonging to an onboard power system when a microcomputer operation error is identified.

In this electric vehicle control device, the reset process device comprises a power shut-off reset process unit for performing a reset process that shuts off the flow of power through the onboard power system and turns off the power relay in this powered-off state when resetting due to a microcomputer operation error not caused by a microcomputer error being identified.

When resetting due to a microcomputer operation error not caused by a microcomputer error being identified, the power shut-off reset process unit thus performs a reset process in which the flow of power through the onboard power system is shut off, and the power relay is turned off in this powered-off state.

For example when resetting due to a microcomputer operation error not caused by a microcomputer error being identified, such as in the case of reprogramming in which the control program of either the first microcomputer or the second microcomputer is rewritten, a process of first shutting off the flow of power through the power system is added, and the power relay is turned off in this powered-off state.

Turning off the power relay in a powered-off state thus eliminates sparking at switch contacts, keeping a switch of the power relay from fusing in an on state.

It is thus possible to prevent fusion in the power relay when resetting due to a microcomputer operation error not caused by a microcomputer error being detected.

BRIEF DESCRIPTION OF THE DRAWINGS

Referring now to the attached drawings which form a part of this original disclosure.

DETAILED DESCRIPTION OF EMBODIMENTS

Figure 1:
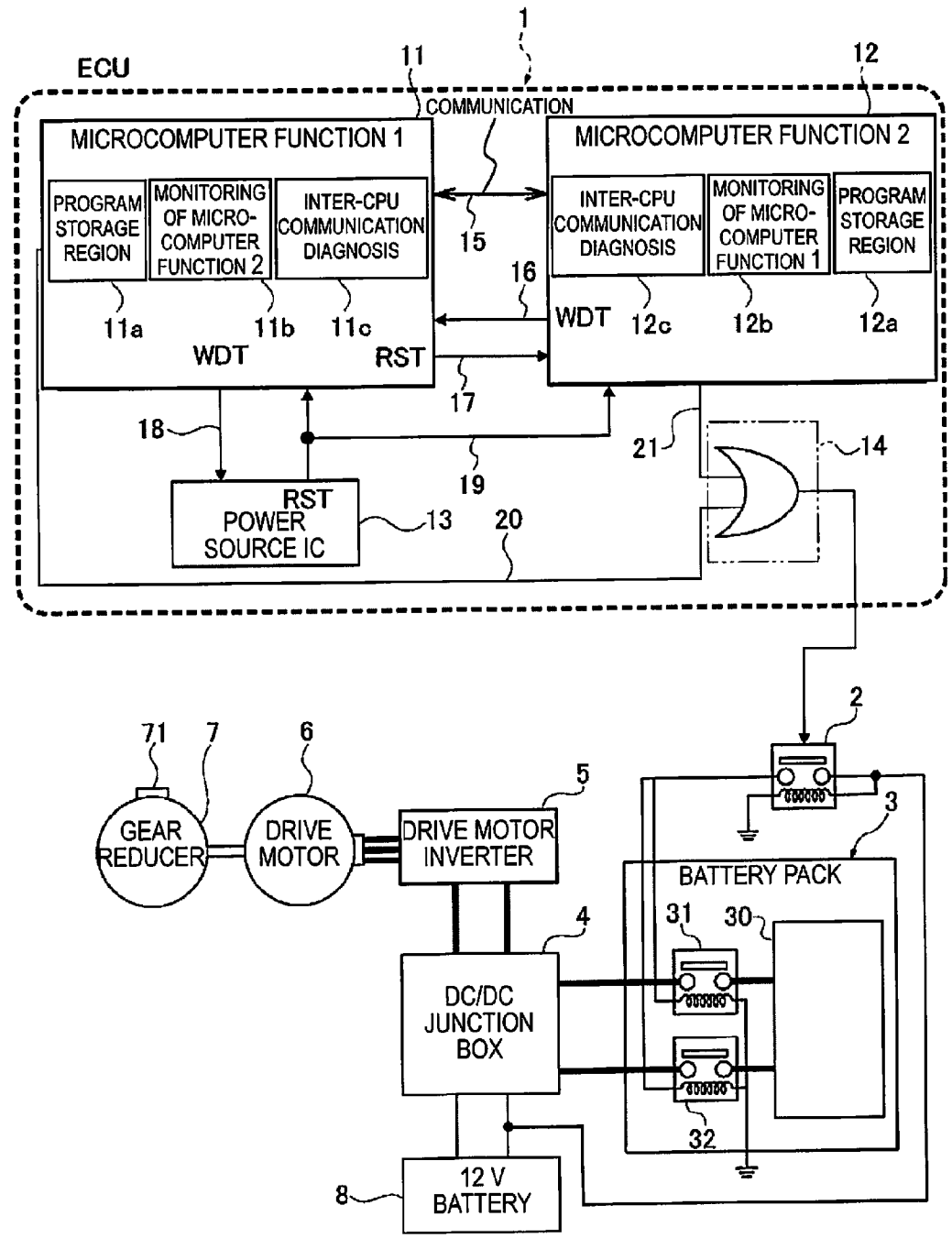
FIG. 1 is an overall system diagram showing an electric car control device according to a first embodiment.

A preferred embodiment of the electric vehicle control device according to the present invention will now be described on the basis of the first embodiment shown in the drawings.

Embodiment 1

First, the configuration of the first embodiment will be described.

The description of the configuration of a control device for an electric car (one type of electric vehicle) according to the first embodiment will be divided into the sections "Overall system configuration" and "Detailed configuration of power shut-off reset process."

Overall System Configuration

FIG. 1 is an overall system diagram showing an electric car control device according to a first embodiment. The following is a description of the overall system configuration based on FIG. 1.

An electric car (EV) to which the control device of the first embodiment is applied includes an electronic control unit 1 (ECU), a fail-safe relay 2, a battery pack 3, a DC/DC junction box 4, a drive motor inverter 5, a drive motor 6, a gear reducer 7, and a 12 V battery 8, as shown in FIG. 1.

The electronic control unit 1 is disposed, for example, in the interior of an instrument panel, and comprises a first microcomputer 11, a second microcomputer 12, a power source IC circuit 13, and a fail-safe circuit 14.

The first microcomputer 11 and the second microcomputer 12 share the 12 V battery 8 and the power source IC circuit 13 (power source), have separate control functions, and allow for independent rewriting of their respective control programs. The first microcomputer 11 comprises a program storage region 11a, a microcomputer function 2 monitoring unit 11b, and an inter-CPU communication diagnostic unit 11c. The second microcomputer 12 comprises a program storage region 12a, a microcomputer function 1 monitoring unit 12b, and an inter-CPU communication diagnostic unit 12c. The microcomputer function 2 monitoring unit 11b and the microcomputer function 1 monitoring unit 12b mutually monitor microcomputer operation, and, when a microcomputer operation error is identified, perform a reset process that turns off power relays 31, 32 belonging to the onboard power system (reset process means or device).

The first microcomputer 11 can be, for example, a VCM main microcomputer into which signals from various sensors and controllers are input via a CAN communications line and which assesses vehicle state on the basis of the inputted signals and comprehensively performs various control processes of the EV system.

The second microcomputer 12 can be, for example, a VCM sub+PBW microcomputer featuring a VCM sub-microcomputer, having the same functions as the VCM main microcomputer, to which a PBW microcomputer has been added. This PBW microcomputer is a controller for outputting drive commands to a parking actuator 71 that controls the locking and unlocking of a parking mechanism within the gear reducer 7 on the basis of signals from a P-range switch not shown in the drawings. "VCM" is an abbreviation for "vehicle control module", and "PBW" is an abbreviation for "park by wire".

The fail-safe circuit 14 is constituted by an OR circuit that outputs an OFF command to the fail-safe relay 2 when a fail-safe relay cut signal is inputted from at least one of the first microcomputer 11 or the second microcomputer 12.

The first microcomputer 11 and the second microcomputer 12 are connected by a serial communication line 15, a WDT signal line 16 for outputting a WDT signal from the second microcomputer 12 to the first microcomputer 11, and an RST signal line 17 for outputting an RST signal from the first microcomputer 11 to the second microcomputer 12. The first microcomputer 11 and the power source IC circuit 13 are connected by a WDT signal line 18 for outputting a WDT signal from the first microcomputer 11 to the power source IC circuit 13. The first microcomputer 11, the second microcomputer 12, and the power source IC circuit 13 are connected by an RST signal line 19 for outputting an RST signal from the power source IC circuit 13 to the first microcomputer 11 and the second microcomputer 12. The first microcomputer 11 and the fail-safe circuit 14 are connected by a first fail-safe relay cut signal line 20, and the second microcomputer 12 and the fail-safe circuit 14 are connected by a second fail-safe relay cut signal line 21. The WDT signal is a watchdog timer signal the level of which is inverted at predetermined time intervals in order to monitor errors in microcomputer operation. The RST signal is a reset signal for requesting a reset process.

The fail-safe relay 2 provides relay actuation power to a first power relay 31 and a second power relay 32 within the battery pack 3, and disconnects the relay actuation power source (12 V battery 8), turning the first power relay 31 and the second power relay 32 off, when an OFF command is outputted from the fail-safe circuit 14.

The battery pack 3 is disposed, for example, at an underfloor position in the center of the wheelbase, and comprises a module stack 30, the first power relay 31, and the second power relay 32.

The module stack 30 is constituted by a stack of multiple modules, each constituted by a bundle of multiple laminated cells, and has a rated voltage output of DC 360 V if, for example, a 48-module lithium ion cell.

The first power relay 31 and the second power relay 32 are built into the battery pack 3, and connect and disconnect the positive and negative sides of the module stack 30 and the DC/DC junction box 4. The onboard power system is constituted by the battery pack 3, the DC/DC junction box 4, the drive motor inverter 5, and the drive motor 6.

The DC/DC junction box 4 has a built-in DC/DC converter for distributing high-voltage power from the battery pack 3, supplying electrical power to the 12 V power system, and charging the 12 V battery 8. The DC/DC junction box 4 also comprises an ordinary charging relay and a rapid charging relay, and can switch between charging circuits according to charging mode.

The drive motor inverter 5 converts DC electrical power from the DC/DC junction box 4 to AC electrical power on the basis of a drive torque signal sent from the VCM via the CAN communications line, and supplies AC electrical power to the drive motor 6 in the form of three-phase alternating current. The drive motor inverter 5 comprises a motor controller, a driver, a smoothing capacitor, a current sensor, and a power module.

The drive motor 6 is disposed in a motor chamber as a travel drive source, and is formed by a permanent magnet synchronous motor. When a positive torque command is issued, the drive motor 6 engages in driving operation for generating drive torque using electrical power discharged from the battery pack 3 (motoring). Conversely, when a negative torque command is issued, the drive motor 6 engages in power generation operation for converting rotational energy from the left and right drive wheels to electrical energy, and uses the generating electrical power to charge the battery pack 3 (regenerating).

The gear reducer 7 comprises a parking mechanism including the parking actuator 71, an input side of the gear reducer being linked to the drive motor 6, and a differential gear unit on an output side of the gear reducer being linked to left and right drive wheels.

The 12 V battery 8 is a power source for the electronic control unit 1, and is also a power source for various other onboard electronic equipment, such as a relay actuation power source for the first power relay 31 and the second power relay 32. When the ignition switch is on, the 12 V battery 8 monitors 12 V battery voltage, and is controlled so as to automatically charge using electrical power from the battery pack 3 when the 12 V battery voltage falls.

Detailed Configuration of Power Shut-Off Reset Process

Figure 2:
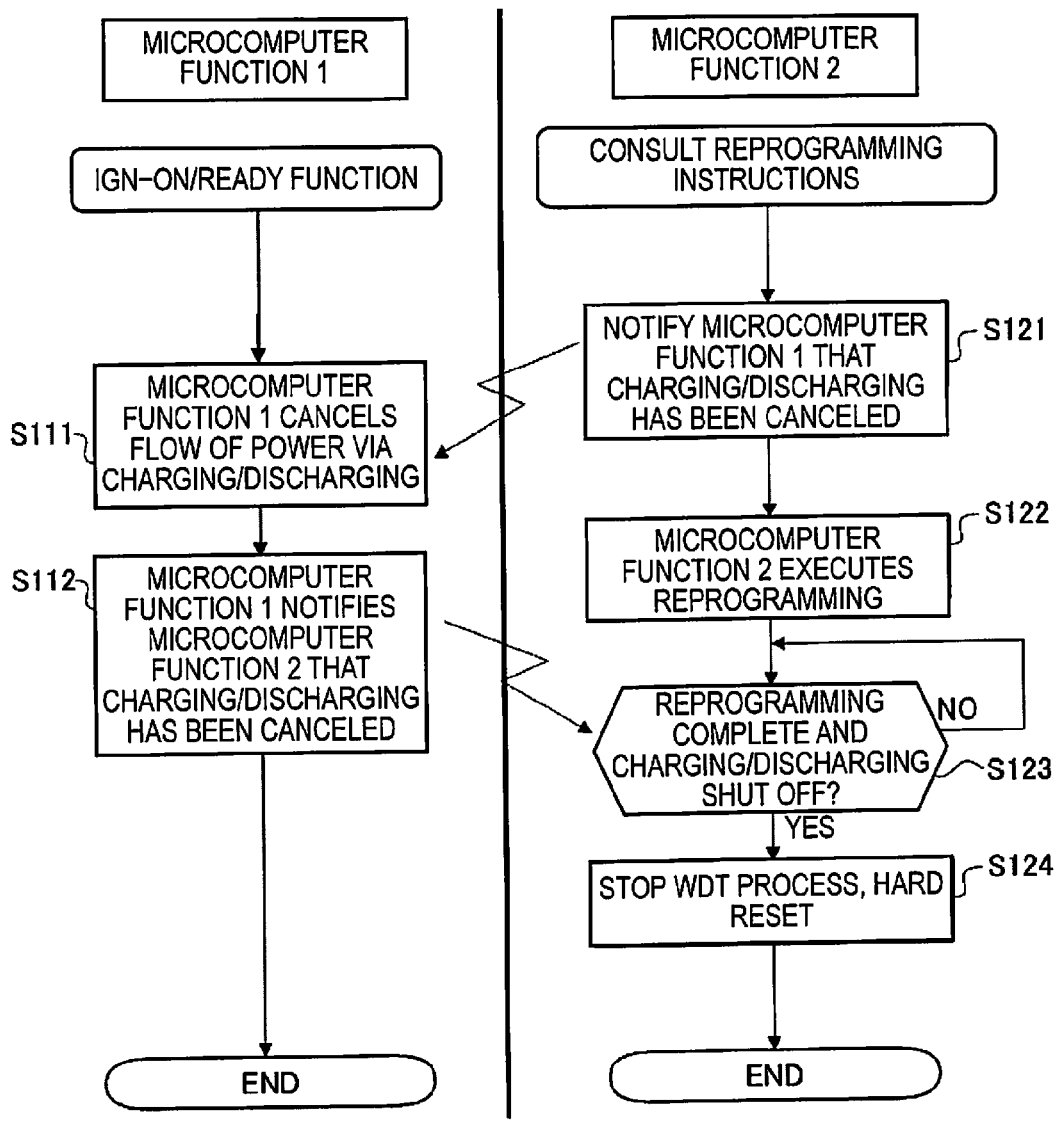
FIG. 2 is a flow chart showing the flow of a power shut-off reset process executed by a first microcomputer and a second microcomputer when a control program of the second microcomputer is rewritten in the electric car control device according to the first embodiment.
Figure 3:
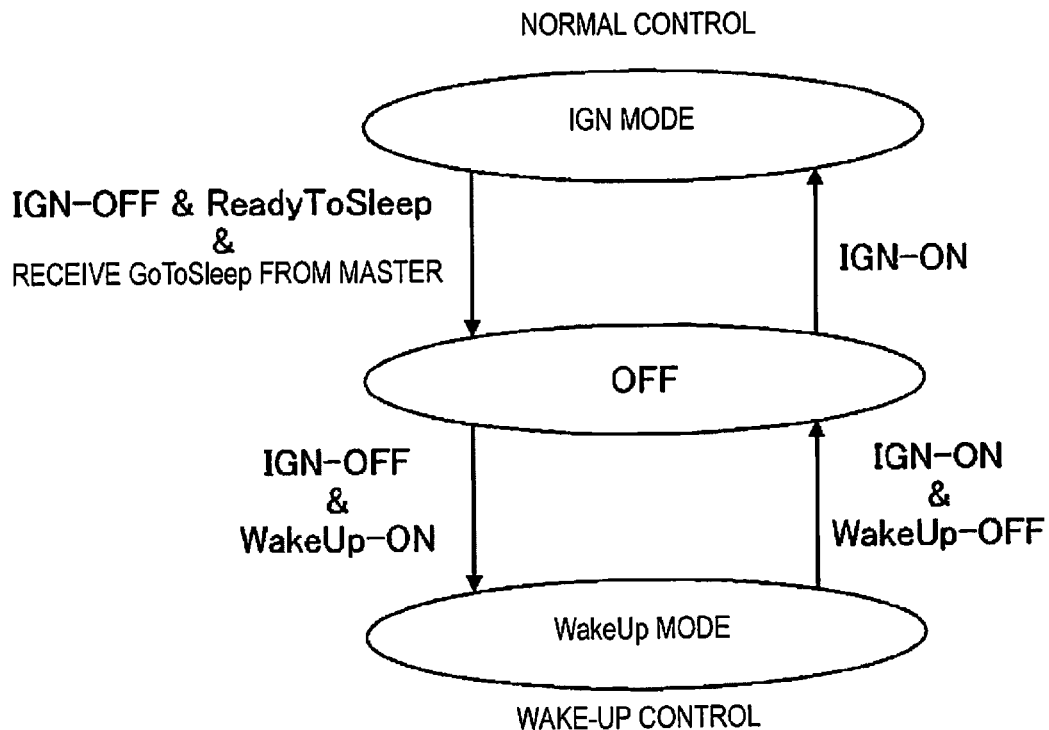
FIG. 3 is a mode shifting diagram showing transitions between a normal mode in which a power shut-off reset process is performed and a wake-up mode in the electric car control device according to the first embodiment.

FIG. 2 shows the flow of a power shut-off reset process executed by the first microcomputer and the second microcomputer when the control program of the second microcomputer is rewritten, and FIG. 3 shows scenarios of mode transitions between a normal mode, in which the power shut-off reset process is performed, and a wake-up mode. The detailed configuration of the power shut-off reset process will now be described with reference to FIGS. 1-3.

As discussed above, the basic function of the microcomputer function 2 monitoring unit 11b and the microcomputer function 1 monitoring unit 12b is to mutually monitor microcomputer operation, and, when a microcomputer operation error is identified, perform a reset process that turns off power relays 31, 32 belonging to the onboard power system (reset process means or device). However, in this reset process, a reset process that shuts off the flow of power through the onboard power system and turns off the power relays 31, 32 in this powered-off state is performed when resetting due to a microcomputer operation error not caused by a microcomputer error being identified (power shut-off reset process).

There are three main scenarios in which the power shut-off reset process is performed:

(1) a reprogramming scenario in which, out of the first microcomputer 11 and the second microcomputer 12, the control program of the second microcomputer 12 is rewritten;

(2) a low-voltage scenario in which the power source voltage of the first microcomputer 11 and the second microcomputer 12 is identified as being less than a voltage threshold value capable of ensuring normal operation; and (3) a mode transition scenario in which there is a transition from normal mode to wake-up mode or from wake-up mode to normal mode.

The reprogramming scenario described in (1) above will be described with reference to FIG. 2.

When the control program of the second microcomputer 12 is to be rewritten, the first microcomputer 11 is in a ready state with the ignition switch on, and the second microcomputer 12 is in a reprogramming instruction state in diagnosis mode. The second microcomputer 12 is reprogrammed by connecting the CAN communications line to a PC and rewriting the control program in the program storage region 12*a*.

In the microcomputer function 1 process performed by the first microcomputer 11, when a command to cancel charging/discharging is received from the second microcomputer 12 via communication, the microcomputer function 1 cancels the flow of power via charging or discharging in step S111. Specifically, when a charging command or discharging command has been issued to the drive motor 6, a zero torque command is issued. If plug-in charging is being performed, the ordinary charging relay or rapid charging relay built into the DC/DC junction box 4 is turned off. In other words, power flowing through a cable harness of the onboard power system in a discharge direction or a charge direction is set to zero. When the microcomputer function 1 confirms that the cancellation of the flow of power via charging or discharging is complete, the microcomputer function 1 notifies the microcomputer function 2 via communication that charging and discharging have been canceled in a subsequent step S112, and the process ends.

In the microcomputer function 2 process performed by the second microcomputer 12, when reprogramming instructions are issued, the microcomputer function 1 is first notified via communication of a command to cancel charging and discharging in step S121 before reprogramming is begun. After notification of the charging/discharging cancellation command has been issued, the microcomputer function 2 begins reprogramming in step S122. Then, in step S123, it is assessed whether reprogramming complete conditions and charging/discharging shut-off complete conditions have been met. The assessment regarding reprogramming complete conditions is made by the microcomputer function 2, and the assessment regarding charging/discharging shut-off complete conditions is made on the basis on notification information received via communication from the microcomputer function 1. As long as a result of NO is returned in step S123, the conditions assessments of step S123 are repeated; when a result of YES is returned in step S123, the process continues to step S124, WDT processing is stopped, a hard reset process (i.e., a process of turning the power relays 31, 32 off) is forcibly performed, and the process ends.

The low-voltage scenario described in (2) above will be described with reference to FIG. 1.

Normal operation of the first microcomputer 11 and the second microcomputer 12 without malfunction assumes that the power source voltage (12 V) for the electronic control unit 1 has been secured.

When the ignition switch is turned on through automatic charging control, the 12 V battery 8 shown in FIG. 1 monitors 12 V battery voltage, thereby inputting 12 V battery voltage monitoring data via the CAN communications line, and identifies a low-voltage scenario if the power source voltage of the first microcomputer 11 and the second microcomputer 12 is lower than a voltage threshold value capable of ensuring normal operation. When a low-voltage scenario is identified, a process of first shutting off the flow of power through the power system is added, and a reset process of shutting off the flow of power through the onboard power system via charging and discharging and turning the power relays 31, 32 off in this powered-off state is performed.

The mode transition scenario described in (3) above will be described with reference to FIG. 3.

An onboard electronic control system possesses a normal mode in which an onboard power source switch (ignition switch) is on, and a wake-up mode in which the onboard power source switch is off but the necessary operation of an onboard controller is ensured.

When transitioning from normal mode (IGN mode) to wake-up mode (WakeUp mode) when IGN-OFF & ReadyToSleep is received in IGN mode, as well as GoToSleep from a master, the mode shifts to off mode. In off mode, when IGN-OFF & WakeUp-ON is received, the mode shifts to WakeUp mode.

Conversely, when transitioning from wake-up mode (WakeUp mode) to normal mode (IGN mode), when IGN-ON & WakeUp-OFF is received in WakeUp mode, the mode shifts to off mode. In off mode, when IGN-ON is received, the mode shifts to IGN mode.

By shifting once to OFF mode in mode transition scenarios, a process of first shutting off the flow of power through the power system when entering off mode is added, and a reset process of shutting off the flow of power through the onboard power system via charging and discharging and turning off the power relays 31, 32 in this powered-off state is performed.

Next, the operation of the present embodiment will be described.

The description of the operation of the electric car control device according to the first embodiment will be divided into the sections "Operation of reset process due to microcomputer error," "Operation of reset process in reprogramming scenarios," "Operation of reset process in low-voltage scenarios," and "Operation of reset process in mode transition scenarios."

Operation of Reset Process Due to Microcomputer Error

When an error occurs in the first microcomputer 11, the WDT signal outputted from the first microcomputer 11 to the power source IC circuit 13 via the WDT signal line 18 is stopped. A microcomputer operation error is identified through this stoppage of the WDT signal, and an RST signal is simultaneously outputted from the power source IC circuit 13 to the first microcomputer 11 and the second microcomputer 12 via the RST signal line 19. Upon receiving the RST signal, the first microcomputer 11 outputs a first fail-safe relay cut signal to the fail-safe circuit 14 via the first fail-safe relay cut signal line 20. Simultaneously, the second microcomputer 12, upon receiving the RST signal, outputs a second fail-safe relay cut signal to the fail-safe circuit 14 via the second fail-safe relay cut signal line 21. Thus, upon receiving an off signal from the fail-safe circuit 14, the fail-safe relay 2 cuts off the relay actuation power source of the power relays 31, 32 belonging to the onboard power system, turning the power relays 31, 32 off.

When an error occurs in the second microcomputer 12, the WDT signal outputted from the second microcomputer 12 to the first microcomputer 11 via the WDT signal line 16 is stopped. The microcomputer function 2 monitoring unit 11b identifies a microcomputer operation error through this stoppage of the WDT signal, and an RST signal is outputted from the first microcomputer 11 to the second microcomputer 12 via the RST signal line 17. Upon receiving the RST signal, the second microcomputer 12 outputs a second fail-safe relay cut signal to the fail-safe circuit 14 via the second fail-safe relay cut signal line 21. Thus, upon receiving an off signal from the fail-safe circuit 14, the fail-safe relay 2 cuts off the relay actuation power source of the power relays 31, 32 belonging to the onboard power system, turning the power relays 31, 32 off.

As discussed above, when a microcomputer error occurs in the first microcomputer 11 or the second microcomputer 12, a microcomputer operation error is identified by monitoring the WDT signal, at which point the power relays 31, 32 are immediately turned off, manifesting the fail-safe function for the reset process.

[Operation of Reset Process in Reprogramming Scenarios]

The operation of the reset process performed by the second microcomputer 12 in reprogramming scenarios will be described with reference to FIG. 2. When beginning reprogramming in which the control program of the second microcomputer 12 is rewritten, the microcomputer function 1 is first notified via communication of a command to cancel charging and discharging in step S121 before reprogramming is begun. After notification of the charging/discharging cancellation command has been issued, reprogramming of the microcomputer function 2 is begun in the subsequent step S122. Next, in step S123, reset process permission conditions are assessed, and if it is confirmed that reprogramming complete conditions and charging/discharging shut-off complete conditions have been met, the process continues to step S124, WDT processing is stopped, and a hard reset process (i.e., a process of turning the power relays 31, 32 off) is forcibly performed.

In a second microcomputer 12 reprogramming scenario, the microcomputer function 1 process performed by the first microcomputer 11 is to cancel the flow of power via charging and discharging in step S111 when the microcomputer function 1 receives a command to cancel charging/discharging from the second microcomputer 12 via communication. Once cancellation of the flow of power via charging and discharging is complete, the microcomputer function 1 notifies the microcomputer function 2 via communication that charging and discharging have been canceled in a subsequent step S112. If cancellation of charging/discharging cannot be completed, the microcomputer function 1 may notify the microcomputer function 2 that cancellation is not possible.

The operation of the power shut-off reset process in the second microcomputer 12 reprogramming scenario will now be described with reference to the sequence shown in FIG. 4. When reprogramming instructions are issued with consult reprogramming instructions as a trigger, the microcomputer function 2 first notifies the microcomputer function 1 via communication that power is to be shut off, and the reprogramming of the microcomputer function 2 is begun. The two operations of reprogramming the microcomputer function 2 and shutting off the power by the microcomputer function 1 are performed simultaneously. Then, once it has been confirmed via communication from the microcomputer function 1 that the power has been shut off and reprogramming of the second microcomputer 12 is complete, a microcomputer function 2 reset process is executed.

In the first embodiment, as described above, an arrangement in which a process of first stopping the flow of power through the onboard power system is added and the power relays 31, 32 are turned off with the onboard power system in this powered-off state has been adopted for reprogramming scenarios in which the control program of the second microcomputer 12 is rewritten.

Turning off the power relays 31, 32 with the flow of power shut off in this way eliminates the generation of sparks at switch contact, as occurs when the relays are turned off in a high-voltage powered state, and keeps switches of the power relays 31, 32 from fusing in an on state.

Thus, when resetting, out of various non-microcomputer-error-related causes, due to a scenario in which the second microcomputer 12 is reprogrammed, a process of first shutting off the flow of power through the power system is added, preventing fusion in the power relays 31, 32.

In the first embodiment, when performing reprogramming in which the control program of the second microcomputer 12 is rewritten, instructions to shut off the flow of power through the onboard power system are issued via communication to the first microcomputer 11, at which point reprogramming is begun. After it has been confirmed via communication from the first microcomputer 11 to the second microcomputer 12 that the power has been shut off and confirmed that reprogramming is complete, a reset process for turning the power relays 31, 32 off is performed.

If, when performing reprogramming, initiation of the reprogramming of the second microcomputer 12 were delayed, for example, until power shutoff was complete, the timing at which the reset process for turning off the power relays 31, 32 is begun would be delayed by the same length of time that was waited for the power to be completely shut off.

By contrast, by simultaneously reprogramming the microcomputer function 2 and shutting off the power in the microcomputer function 1, the timing at which the reset process for turning off the power relays 31, 32 is begun is advanced. In addition, performing the reset process after confirming that power to the onboard power system has been completely shut off reliably prevents fusion in the power relays 31, 32.

Operation of Reset Process in Low-Voltage Scenarios

When the power source voltage of the electronic control unit 1 is low, the first microcomputer 11 and the second microcomputer 12 malfunction due to this low voltage, and the WDT signal is stopped, a reset process is performed.

Thus, 12 V battery voltage monitoring data is inputted from the automatic charging control system of the 12 V battery 8 via the CAN communications line, and a low-voltage scenario is identified if the power source voltage of the first microcomputer 11 and the second microcomputer 12 is lower than a voltage threshold value capable of ensuring normal operation. When a low-voltage scenario is identified, a process of first shutting off the flow of power through the power system is added, and a reset process of shutting off the flow of power through the onboard power system via charging and discharging and turning the power relays 31, 32 off in this powered-off state is performed.

Thus, when resetting, out of various non-microcomputer-error-related causes, due to a scenario in which the power source voltage of the first microcomputer 11 and the second microcomputer 12 is low, a process of first shutting off the flow of power through the power system is added, preventing fusion in the power relays 31, 32.

Operation of Reset Process in Mode Transition Scenarios

When transitioning from normal mode (IGN mode) to wake-up mode (WakeUp mode), the mode shifts from IGN mode to off mode to WakeUp mode. When transitioning from wake-up mode (WakeUp mode) to normal mode (IGN mode), the mode shifts from WakeUp mode to off mode to IGN mode. By shifting once to off mode in this way in mode transition scenarios, a reset process is performed when the WDT signal is stopped in off mode.

Thus, in mode transition scenarios, a process of first shutting off the flow of power through the power system when entering off mode is added, and a reset process of shutting off the flow of power through the onboard power system via charging and discharging and turning off the power relays 31, 32 in this powered-off state is performed.

Thus, when resetting, out of various non-microcomputer-error-related causes, due to a scenario of transitioning between normal mode and wake-up mode, a process of first shutting off the flow of power through the power system is added, preventing fusion in the power relays 31, 32.

Next, the effects of the present embodiment will be described.

The following effects can be obtained from the electric car control device according to the first embodiment.

(1) An electric vehicle (electric car) control device including:

a first microcomputer 11 and a second microcomputer 12 that share a power source (a 12 V battery 8 and a power source IC circuit 13), possess separate control functions, and allow for independent rewriting of respective control programs; and reset process means or device for monitoring the mutual microcomputer operation of the first microcomputer 11 and the second microcomputer 12 and performing a reset process that turns off power relays 31, 32 belonging to an onboard power system when a microcomputer operation error is identified;

the reset process means or device comprising a power shut-off reset process unit for performing a reset process that shuts off the flow of power through the onboard power system and turns off the power relays 31, 32 in this powered-off state when resetting due to a microcomputer operation error not caused by a microcomputer error being identified (FIG. 1).

It is thus possible to prevent fusion in the power relays 31, 32 when resetting due to a microcomputer operation error not caused by a microcomputer error being detected.

(2) The power shut-off reset process unit treats a reset performed due to the identification of a microcomputer operation error not caused by a microcomputer error as a reprogramming scenario in which a control program of either the first microcomputer 11 or the second microcomputer 12 is rewritten (FIG. 2).

Thus, in addition to the effects of (1), when resetting, out of various non-microcomputer-error-related causes, due to a reprogramming scenario in which the control program of either the first microcomputer 11 or the second microcomputer 12 is rewritten, a process of first shutting off the flow of power through the power system is added, thereby allowing for the prevention of fusion in the power relays 31, 32.

Figure 4:
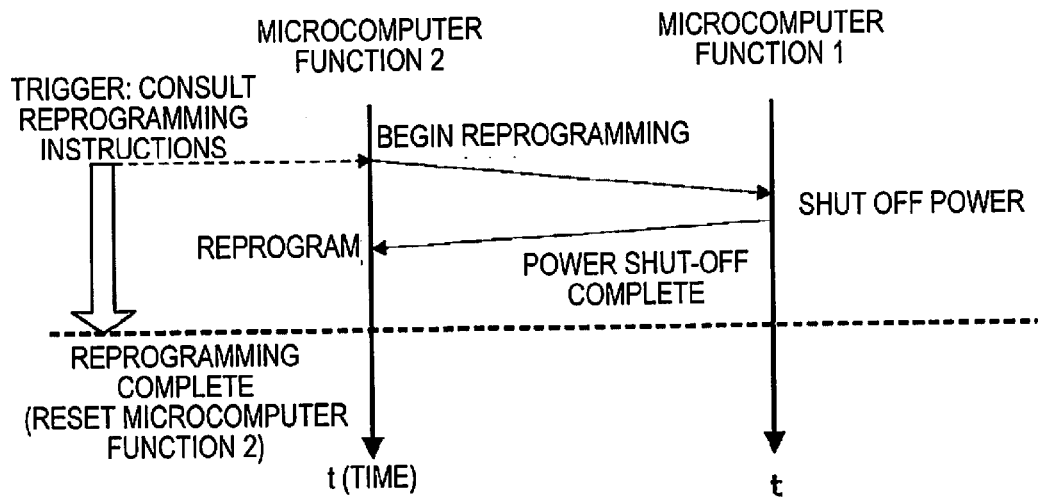
FIG. 4 is a sequence diagram showing the operation of a power shut-off reset process in a reprogramming scenario in which the control program of the second microcomputer is rewritten in the electric car control device according to the first embodiment.

(3) When reprogramming is performed in which the control program of either the first microcomputer 11 or the second microcomputer 12 is rewritten, the power shut-off reset process unit begins reprogramming when instructions to first shut off the flow of power through the onboard power system are issued via communication from the microcomputer for which the control program is being rewritten to the other microcomputer, and, after it has been confirmed via communication from the other microcomputer to the first microcomputer that the flow of power has been shut off, and it has been confirmed that reprogramming is complete, a reset process for turning off the power relays 31, 32 is performed (FIG. 4).

Thus, in addition to the effects of (2), fusion in the power relays 31, 32 can be reliably prevented when resetting in a reprogramming scenario, allowing the timing at which the reset process for turning off the power relays 31, 32 is begun to be advanced.

(4) The power shut-off reset process unit treats a reset performed due to the identification of a microcomputer operation error not caused by a microcomputer error as a low-voltage scenario in which the power source voltage (12 V battery voltage) of the first microcomputer 11 and the second microcomputer 12 is identified as being lower than a voltage threshold value capable of ensuring normal operation (FIG. 1).

Thus, in addition to the effects of (1) to (3), when resetting, out of various non-microcomputer-error-related causes, due to a scenario in which the power source voltage of the first microcomputer 11 and the second microcomputer 12 is low, a process of first shutting off the flow of power through the power system is added, thereby allowing for the prevention of fusion in the power relays 31, 32.

(5) The onboard electronic control system possesses a normal mode in which the onboard power source switch (ignition switch) is on, and a wake-up mode in which the onboard power source switch is off but the necessary operation of an onboard controller is ensured, and the power shut-off reset process unit treats a reset performed due to the identification of a microcomputer operation error not caused by a microcomputer error as a mode transition scenario of transitioning from the normal mode to the wake-up mode or from the wake-up mode to the normal mode (FIG. 3).

Thus, in addition to the effects of (1) to (3), when resetting, out of various non-microcomputer-error-related causes, due to a scenario of transitioning between normal mode and wake-up mode, a process of first shutting off the flow of power through the power system is added, thereby allowing for the prevention of fusion in the power relays 31, 32.

(6) The first microcomputer 11 and the second microcomputer 12 are present within a single electronic control unit 1 (FIG. 1) for controlling the onboard power system (FIG. 1).

Thus, in addition to the effects of (1) to (5), it is possible, in an electric vehicle (electric car) comprising two microcomputers 11, 12, the microcomputers having separate control functions and allowing for independent rewriting of their respective control programs, provided integrally within a single electronic control unit 1, to prevent fusion of power relays 31, 32 when resetting due to a microcomputer operation error not caused by a microcomputer error being identified.

The foregoing has been a description of a first embodiment of the electric vehicle control device according to the present invention, but the specific configuration of the present invention is not limited to these embodiments, and various modifications and additions may be made to the design to the extent that they do not depart from the gist of the invention as set forth in the claims.

In the first embodiment, an example has been given in which a VCM main microcomputer is used for the first microcomputer 11 and a VCM sub+PBW microcomputer is used for the second microcomputer 12. However, the present invention is not limited to the first embodiment as long as two controllers capable of being used in combination from among multiple onboard controllers are used as the first microcomputer and the second microcomputer. For example, in the case of a hybrid vehicle, the first microcomputer may be an integrated controller, and the second microcomputer a motor controller. In short, any two microcomputers that share a power source, have separate control functions, and allow for independent rewriting of their respective control programs may be used.

In the first embodiment, an example has been given in which the first microcomputer 11 and the second microcomputer 12 are integrally present in a single electronic control unit 1 for controlling the onboard power system. However, the first microcomputer and the second microcomputer may also be present on substrates on the same base plate, or the first microcomputer and the second microcomputer may be provided separately.

In the first embodiment, a reprogramming scenario, a low-voltage scenario, and a mode transition scenario are given as examples of scenarios in which the power shut-off reset process is performed. However, other scenarios requiring a power shut-off reset process apart from these three may be added as scenarios in which a power shut-off reset process is performed. Alternatively, the power shut-off reset process may be limited to being performed in one or two selected scenarios of these three.

In the first embodiment, an example in which the control device of the present invention is applied to an electric car has been described. However, the control device of the present invention can also be applied to other types of electric vehicles, such as hybrid vehicles and fuel cells vehicles. In short, the invention can be applied to any vehicle that includes an onboard power system in which a power relay belonging to the onboard power system is turned off when a reset process is performed.

The invention claimed is:

1. An electric vehicle control device comprising:
a first microcomputer and a second microcomputer that share a power source, possess separate control functions, and are programmed for independent rewriting of respective control programs; and
a reset process device configured to monitor mutual microcomputer operation of the first microcomputer and the second microcomputer and to perform a reset process that turns off a power relay belonging to an onboard power system when a microcomputer operation error of at least one of the first microcomputer and the second microcomputer is identified,
the reset process device comprising a power shut-off reset process unit configured to perform a reset process that shuts off the flow of power through the onboard power system and to turn off the power relay in this powered-off state when resetting due to the microcomputer operation error of at least one of the first microcomputer and the second microcomputer, not caused by a microcomputer error of the at least one of the first microcomputer and the second microcomputer, is identified.

2. The electric vehicle control device according to claim 1, wherein
the power shut-off reset process unit is configured to treat a reset performed due to the identification of the microcomputer operation error of at least one of the first microcomputer and second microcomputer, not caused by a microcomputer error of the at least one of the first microcomputer and the second microcomputer, as a reprogramming scenario in which a control program of either the first microcomputer or the second microcomputer is rewritten.

3. The electric vehicle control device according to claim 2, wherein
when reprogramming in which the control program of either the first microcomputer or the second microcomputer is rewritten is to be performed, the power shut-off reset process unit begins reprogramming when instructions to first shut off the flow of power through the onboard power system are issued via communication from the microcomputer for which the control program is being rewritten to the other microcomputer, and, after it has been confirmed via communication from the other microcomputer to the microcomputer for which the control program is being rewritten that the flow of power has been shut off, and it has been confirmed that reprogramming is complete, a reset process for turning off the power relay is performed.

4. The electric vehicle control device according to claim 1, wherein
the power shutoff reset process unit is configured to treat a reset performed due to the identification of the microcomputer operation error of at least one of the first microcomputer and the second microcomputer, not caused by a microcomputer error of the at least one of the first microcomputer and the second microcomputer, as a low-voltage scenario in which the power source voltage of the first microcomputer and the second microcomputer is identified as being lower than a voltage threshold value capable of ensuring normal operation.

5. The electric vehicle control device according to claim 1, further comprising
an onboard electronic control system possessing a normal mode in which an onboard power source switch is on, and a wake-up mode in which the onboard power source switch is off but the necessary operation of an onboard controller is ensured, and
the power shut-off reset process unit being configured to treat a reset performed due to the identification of the microcomputer operation error of at least one of the first microcomputer and the second microcomputer, not caused by a microcomputer error of the at least one of the first microcomputer and the second microcomputer, as a mode transition scenario of transitioning from the normal mode to the wake-up mode or from the wake-up mode to the normal mode.

6. The electric vehicle control device according to claim 1, wherein
the first microcomputer and the second microcomputer are present within a single electronic control unit configured to control the onboard power system.

7. The electric vehicle control device according to claim 2, wherein
the power shut-off reset process unit is configured to treat a reset performed due to the identification of the microcomputer operation error of at least one of the first microcomputer and the second microcomputer, not caused by a microcomputer error of the at least one of the first microcomputer and the second microcomputer, as a low-voltage scenario in which the power source voltage of the first microcomputer and the second microcomputer is identified as being lower than a voltage threshold value capable of ensuring normal operation.

8. The electric vehicle control device according to claim 3, wherein
the power shutoff reset process unit is configured to treat a reset performed due to the identification of the microcomputer operation error of at least one of the first microcomputer and the second microcomputer, not caused by a microcomputer error of the at least one of the first microcomputer and the second microcomputer, as a low-voltage scenario in which the power source voltage of the first microcomputer and the second microcomputer is identified as being lower than a voltage threshold value capable of ensuring normal operation.

9. The electric vehicle control device according to claim 2, further comprising an onboard electronic control system possessing a normal mode in which an onboard power source switch is on, and a wake-up mode in which the onboard power source switch is off but the necessary operation of an onboard controller is ensured, and the power shutoff reset process unit being configured to treat a reset performed due to the identification of the microcomputer operation error of at least one of the first microcomputer and the second microcomputer not caused by a microcomputer error of the at least one of the first microcomputer and the second microcomputer, as a mode transition scenario of transitioning from the normal mode to the wake-up mode or from the wake-up mode to the normal mode.

10. The electric vehicle control device according to claim 3, further comprising an onboard electronic control system possessing a normal mode in which an onboard power source switch is on, and a wake-up mode in which the onboard power source switch is off but the necessary operation of an onboard controller is ensured, and the power shut-off reset process unit being configured to treat a reset performed due to the identification of the microcomputer operation error of at least one of the first microcomputer and the second microcomputer, not caused by a microcomputer error of the at least one of the first microcomputer and the second microcomputer, as a mode transition scenario of transitioning from the normal mode to the wake-up mode or from the wake-up mode to the normal mode.

11. The electric vehicle control device according to claim 4, further comprising an onboard electronic control system possessing a normal mode in which an onboard power source switch is on, and a wake-up mode in which the onboard power source switch is off but the necessary operation of an onboard controller is ensured, and the power shut-off reset process unit being configured to treat a reset performed due to the identification of the microcomputer operation error of at least one of the first microcomputer and the second microcomputer, not caused by a microcomputer error of the at least one of the first microcomputer and the second microcomputer, as a mode transition scenario of transitioning from the normal mode to the wake-up mode or from the wake-up mode to the normal mode.

12. The electric vehicle control device according to claim 2, wherein the first microcomputer and the second microcomputer are present within a single electronic control unit configured to control the onboard power system.

13. The electric vehicle control device according to claim 3, wherein the first microcomputer and the second microcomputer are present within a single electronic control unit configured to control the onboard power system.

14. The electric vehicle control device according to claim 4, wherein the first microcomputer and the second microcomputer are present within a single electronic control unit configured to control the onboard power system.

15. The electric vehicle control device according to claim 5, wherein the first microcomputer and the second microcomputer are present within a single electronic control unit configured to control the onboard power system.

* * * * *